(12) United States Patent
Cao

(10) Patent No.: US 6,169,616 B1
(45) Date of Patent: Jan. 2, 2001

(54) OPTICAL AND PROGRAMMABLE FIBER OPTIC WAVELENGTH ADD/DROP SYSTEM

(75) Inventor: Simon X. F. Cao, San Mateo, CA (US)

(73) Assignee: Avanex Corporation, Fremont, CA (US)

( * ) Notice: Under 35 U.S.C. 154(b), the term of this patent shall be extended for 0 days.

(21) Appl. No.: 09/090,449

(22) Filed: Jun. 4, 1998

(51) Int. Cl.[7] .................................................. H04J 14/02
(52) U.S. Cl. ............................................ 359/130; 359/127
(58) Field of Search ................................... 359/124, 130, 359/127; 385/37

(56) References Cited

U.S. PATENT DOCUMENTS

| | | | |
|---|---|---|---|
| 5,414,548 | * 5/1995 | Tachikawa et al. | 359/130 |
| 5,488,500 | * 1/1996 | Glance | 359/127 |
| 5,600,466 | * 2/1997 | Tsushima et al. | 359/124 |
| 5,726,785 | * 3/1998 | Chawki et al. | 359/130 |
| 5,801,858 | * 9/1998 | Roberts et al. | 359/114 |
| 5,822,113 | * 10/1998 | Delavaux | 359/341 |
| 5,881,199 | * 3/1999 | Li | 385/140 |
| 5,953,141 | * 9/1999 | Liu et al. | 359/124 |
| 5,974,212 | * 10/1999 | Saeki | 385/37 |
| 6,049,645 | * 4/2000 | Pan et al. | 385/39 |

FOREIGN PATENT DOCUMENTS

2315380 * 1/1998 (GB) .

* cited by examiner

*Primary Examiner*—Leslie Pascal
(74) *Attorney, Agent, or Firm*—Sawyer Law Group LLP

(57) ABSTRACT

An optical and programmable wavelength add/drop system for optical networks is provided. It includes the providing of a first optical signal on the first optical loop as a plurality of wavelengths, each wavelength residing on a separate path, such that the providing occurs in the optical domain; the reflecting of any of the plurality of wavelengths; the dropping of any of the plurality of wavelengths from the first optical loop into the second optical loop and for the adding of corresponding wavelengths from the second optical loop into the first optical loop, such that the dropping and adding occurs in the optical domain; and the combining of the reflected wavelengths and the added wavelengths into a second signal. With the add/drop system in accordance with the present invention, dispersion compensation, signal amplification, and gain equalization involved in the providing of the plurality of wavelength, as well as the switching function involved in the dropping and adding of wavelengths, may be performed without the need to convert the signal from the optical domain to the electrical domain and then back to the optical domain, rendering the add/drop system simpler and less costly to implement than conventional systems. The present invention has the added advantages of being capable of broadcasting and the monitoring of the adding and dropping of wavelengths individually. The programmable nature of the present invention reduces the required number of dense wavelength division multiplexers, and its modular design allows flexibility in upgrades to more complex systems.

9 Claims, 8 Drawing Sheets

OPTICAL AND PROGRAMMABLE FIBER OPTIC WAVELENGTH ADD/DROP SYSTEM

FIELD OF THE INVENTION

The present invention relates to fiber optic networks, and more particularly to fiber optic wavelength add/drop systems.

BACKGROUND OF THE INVENTION

Fiber optic networks are becoming increasingly popular for data transmission due to their high speed, high capacity capabilities. Multiple wavelengths may be transmitted along the same optic fiber. These wavelengths are sent combined as a single signal. A crucial feature of a fiber optic network is the exchange of wavelengths between signals on "loops" within networks. The exchange occurs at connector points, or points where two or more loops intersect for the purpose of exchanging wavelengths.

The exchanging of data signals involves the exchanging of matching wavelengths from two different loops within an optical network. In other words, each signal would drop a wavelength to the other loop while simultaneously adding the matching wavelength from the other loop. The adding and dropping of wavelengths always occur together. Each wavelength is commonly referred to as a "channel." Add/drop systems exist at the connector points for the management of these exchanges.

FIG. 1 illustrates a simplified optical network 100. A fiber optic network 100 could comprise a main loop 150 which connects primary locations, such as San Francisco and New York. In-between the primary locations are local loops 110, 120 which connect with the main loop 150 at connector points 140 and 160. A local loop could be, for example, an optical system servicing a particular area. Thus, if local loop 110 is Sacramento, an optical signal would travel from San Francisco, add and drop channels with Sacramento's signal at connector point 140, and the new signal would travel forward to connector point 160 where channels are added and dropped with local loop 120, and eventually to New York. Within loop 110, optical signals would be transmitted to various locations within its loop, servicing the Sacramento area. Local receivers 170 would reside at various points within the loop to convert the optical signals into signals in the appropriate protocol format. Loops 110 and 120 may also exchange channels directly with each other through a connector point 130 between them. An add/drop system would reside on loop 110 at the connector point 130 while a mirror image of the same add/drop system would reside on loop 120. Each loop includes an optical signal comprising channels $\lambda_1$–$\lambda_n$. If, for example, channel $\lambda_2$ is to be exchanged, loop 110 would drop its $\lambda_2$ while adding loop 120's $\lambda_2$ to its signal. In the same manner, loop 120 would drop its $\lambda_2$ while adding loop 110's $\lambda_2$ to its signal. Then each loop would transport it's respective new signals to the next destination.

FIG. 2 illustrates a conventional add/drop system 200. First, the optical signal from loop 110 is separated into its individual channels by a wavelength division multiplexer 210A. The same occurs with the optical signal from loop 120 by the wavelength division multiplexer 210B. Each optical channel then travels along a separate optic fiber 260 to a receiver 220 which converts the channels into electrical signals. The electrical signals travel to the regenerator 230 which reshapes them to compensate for dispersions, gain loss, and attenuation. The regenerator 230 also comprises electrical switches which directs the proper electrical signals to be added/dropped. The add/drop function then occurs in the following manner:

Signals on loop 110 which are to stay on loop 110 are sent by the regenerator 230 to loop 110's wavelength division multiplexer 250A.

Signals on loop 120 which are to stay on loop 120 are sent by the regenerator 230 to loop 120's wavelength division multiplexer 250B.

Signals to be dropped from loop 110 (or added to loop 120) are sent to loop 120's wavelength division multiplexer 250B by the regenerator 230. Loop 120's corresponding channels to be added to loop 110 (or dropped from loop 120) are directed by the regenerator 230 to loop 110's wavelength division multiplexer 250A.

Thus, the regenerator 230 functions similarly to a 2×2 switch. In route to the correct wavelength division multiplexer, each signal is converted back into an optical channel by transmitters 240. The wavelength division multiplexers 250A–250B then recombines the channels sent to it into a single signal. The new signals for Loops 110 and 120 then continue to their respective next destinations.

A problem with conventional add/drop systems is the need to convert data signals sent in the optical domain to the electrical domain in order to effectuate the add/drop. Then signals must be converted back from the electrical domain to the optical domain before being transported to its next destination. Conventional add/drop systems are also cumbersome and inflexible due to the conversion requirement. Typically, the conversion required only allows the add/drop system to be operable for a particular protocol, at one particular speed, and for a certain number of wavelengths. If a different protocol is to be used, a faster speed is desired, or more wavelengths are to be added, each add/drop system along each connector point of the entire optical network 100 much be replaced. Since an optical network could comprise hundreds of connector points, the upgrading of a conventional add/drop system for an optical network is costly and difficult to do. What is desired therefore is a fiber optic wavelength add/drop system which does not have the optical to electrical to optical conversion requirement of the conventional systems. Thus, there is a need for an optical add/drop system which is programmable and which is simpler and more cost efficient to implement. The present invention addresses such a need.

SUMMARY OF THE INVENTION

An optical and programmable wavelength add/drop system for optical networks is provided. It includes the providing of a first optical signal on the first optical loop as a plurality of wavelengths, each wavelength residing on a separate path, such that the providing occurs in the optical domain; the reflecting of any of the plurality of wavelengths; the dropping of any of the plurality of wavelengths from the first optical loop into the second optical loop and for the adding of corresponding wavelengths from the second optical loop into the first optical loop, such that the dropping and adding occurs in the optical domain; and the combining of the reflected wavelengths and the added wavelengths into a second signal. With the add/drop system in accordance with the present invention, dispersion compensation, signal amplification, and gain equalization involved in the providing of the plurality of wavelength, as well as the switching function involved in the dropping and adding of wavelengths, may be performed without the need to convert the signals from the optical domain to the electrical domain and then back to the optical domain, rendering the add/drop system simpler and less costly to implement than conventional systems. The present invention has the added advantages of being capable of broadcasting and the monitoring of the adding and dropping of wavelengths individually. The programmable nature of the present invention reduces the required number of dense wavelength division multiplexers, and its modular design allows flexibility in upgrading to more complex systems.

DETAILED DESCRIPTION

The present invention relates to a wavelength add/drop system for the exchange of data between loops in an optic network which is optical and programmable and which is simpler and more cost efficient to implement than conventional systems.

The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 3A through 7 in conjunction with the discussion below.

Figure 3A:
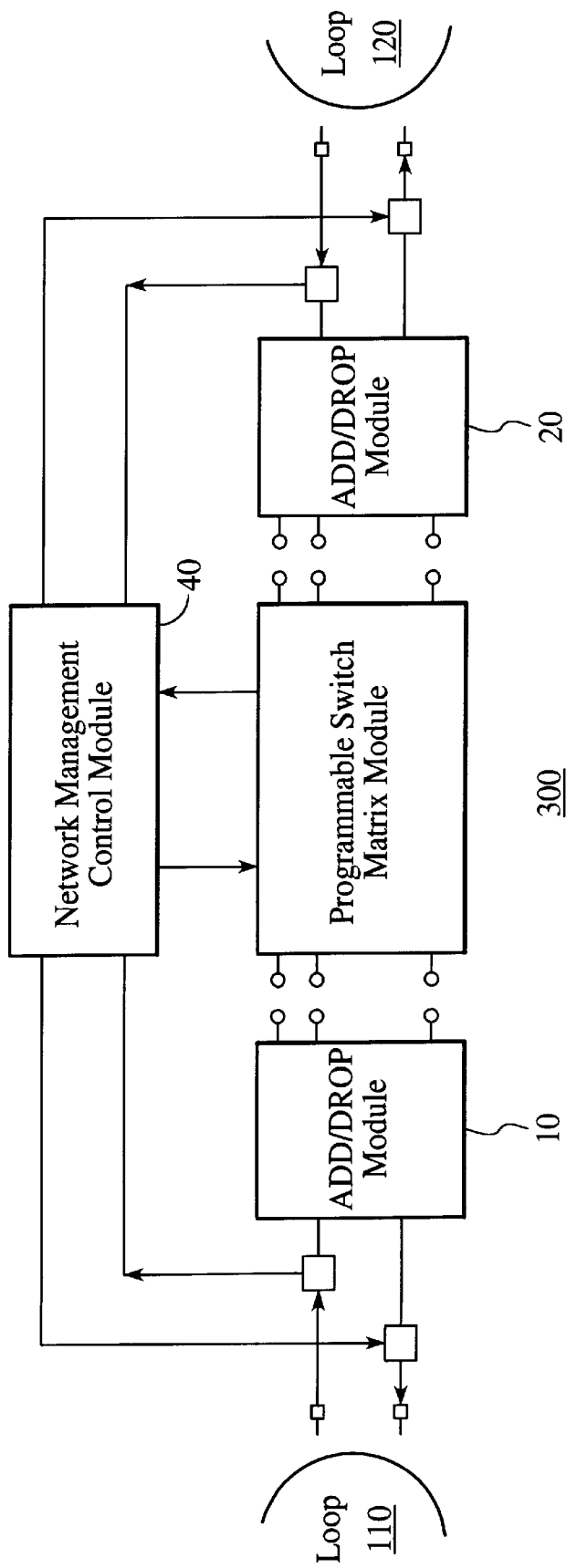
FIG. 3A is a block diagram of an add/drop system in accordance with the present invention.

FIG. 3A is a simple block diagram of a programmable optical add/drop system in accordance with the present invention. This system does not require conversion of its optical signal from the optical domain to the electrical domain in the performance of the add/drop function. Thus, this system would avoid the problems described above. This system 300 includes add/drop modules 10 and 20, and a programmable switch matrix module 30 between them. The add/drop system is overseen by a network management control module 40. The network management control module 40 receives information through a supervisory channel about the adds and drops from various photodiodes within the add/drop modules and controls the various elements in the modules accordingly. It is able to manage a supervisory channel as part of the signals traveling in the optic network 100. The supervisory channel relays information on the status of the adds and drops in an add/drop system and carries it to the next connector point.

Figure 1:
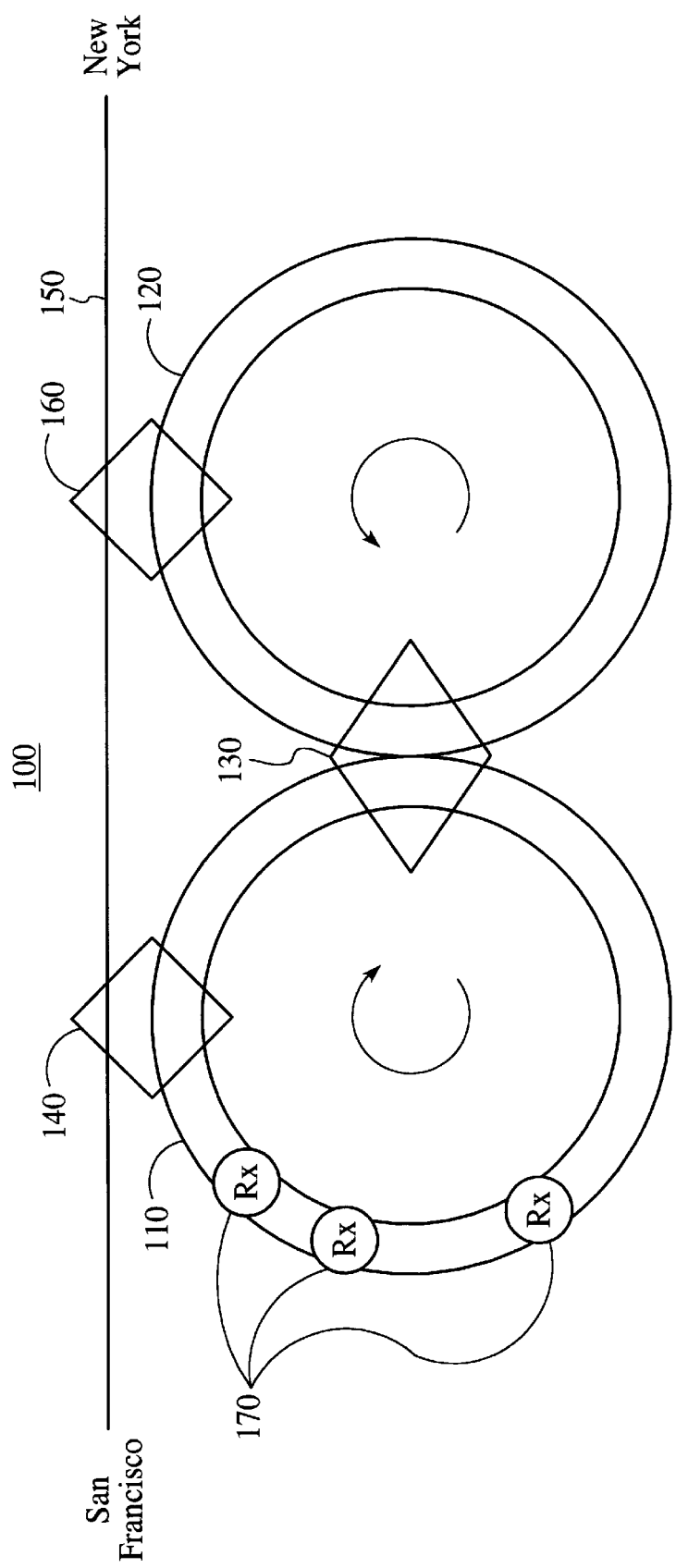
FIG. 1 is an illustration of a simplified optic network with connector points.

The system 300 would reside at the connector point 130 of FIG. 1 with one of the add/drop modules 10 residing on loop 110 while a mirror image of the add/drop module 20 would reside on loop 120. Although the preferred embodiment is described as a system residing on a connector point between two local loops, one of ordinary skill in the art will understand that the same system could also reside on connector points 140 and 160 between a local loop 110, 120 and a main loop 150 without departing from the spirit and scope of the present invention.

Figure 3B:
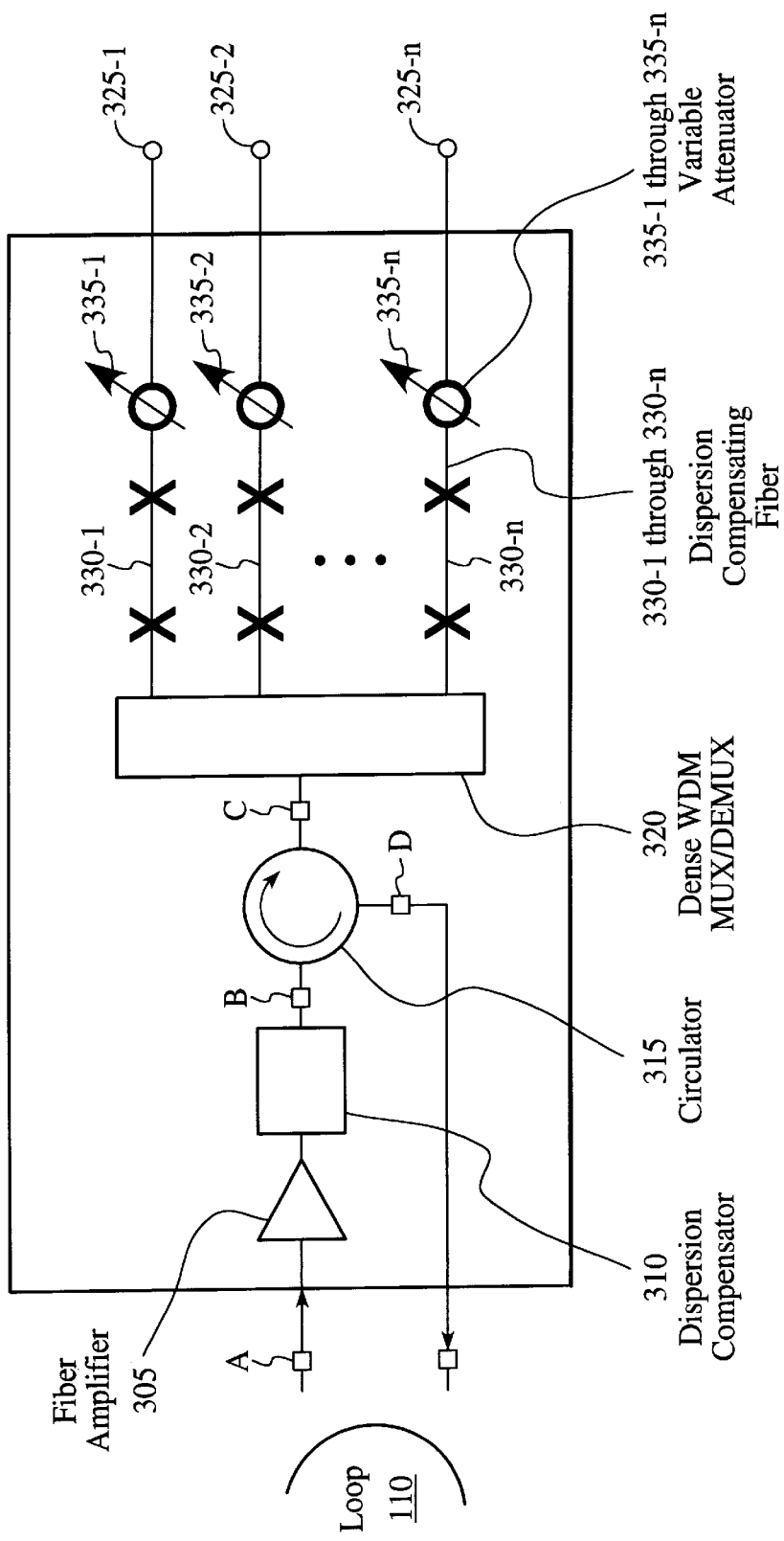
FIG. 3B is a block diagram of an add/drop module for the add/drop system in accordance with the present invention.

FIG. 3B is a simplified block diagram of an add/drop module 10 in accordance with the present invention. The add/drop module 20 would have the mirror image of this structure. The optical signal from loop 110 comes into the system at node A and is the input to a Fiber Amplifier 305, such as the Erbium Dopped Fiber Amplifier, which amplifies the signal. The Fiber Amplifier 305 addresses the problem of signal attenuation, or loss of signal strength, which is a problem when a signal travels more than 50 km. Thus, the signal is amplified before it is further processed.

Next, the signal is sent to the Dispersion Compensator 310. The Dispersion Compensator 310 compresses the optical signal to compensate for chromatic dispersion which occurs in the high speed optical transmission of data. Chromatic dispersion refers to the effect where the channels within a signal travel through an optic fiber at different speeds, i.e., longer wavelengths travel faster than shorter wavelengths. This is a particular problem for data transmission speed higher than 2.5 gigabytes per second. The resulting pulses of the signal will be stretched, possibly overlap, and make it more difficult for a receiver to distinguish where one pulse begins and another ends. This seriously compromises the integrity of the signal.

Although the preferred embodiment is described with the utilizing of a Dispersion Compensator 310 to compress the signal to compensate for chromatic dispersion, one of ordinary skill in the art will understand that other methods may be used to compress the signal without departing from the spirit and scope of the present invention.

The compressed and amplified signal then arrives at node B. A circulator 315 directs the signal to node C to be processed by a Dense Wavelength Division Multiplexer 320 (DWDM). The circulator 315 has further function in directing the new signal generated after the add/drop function is performed. This will be described in more detail later.

The signal next enters the DWDM 320, which separates the signal into its component channels. This is accomplished, for example, by passing the signal through glass pieces (not shown) covered with reflective coatings, such that the signal is reflected (or refracted) at an angle, dividing the signal.

Figure 4:
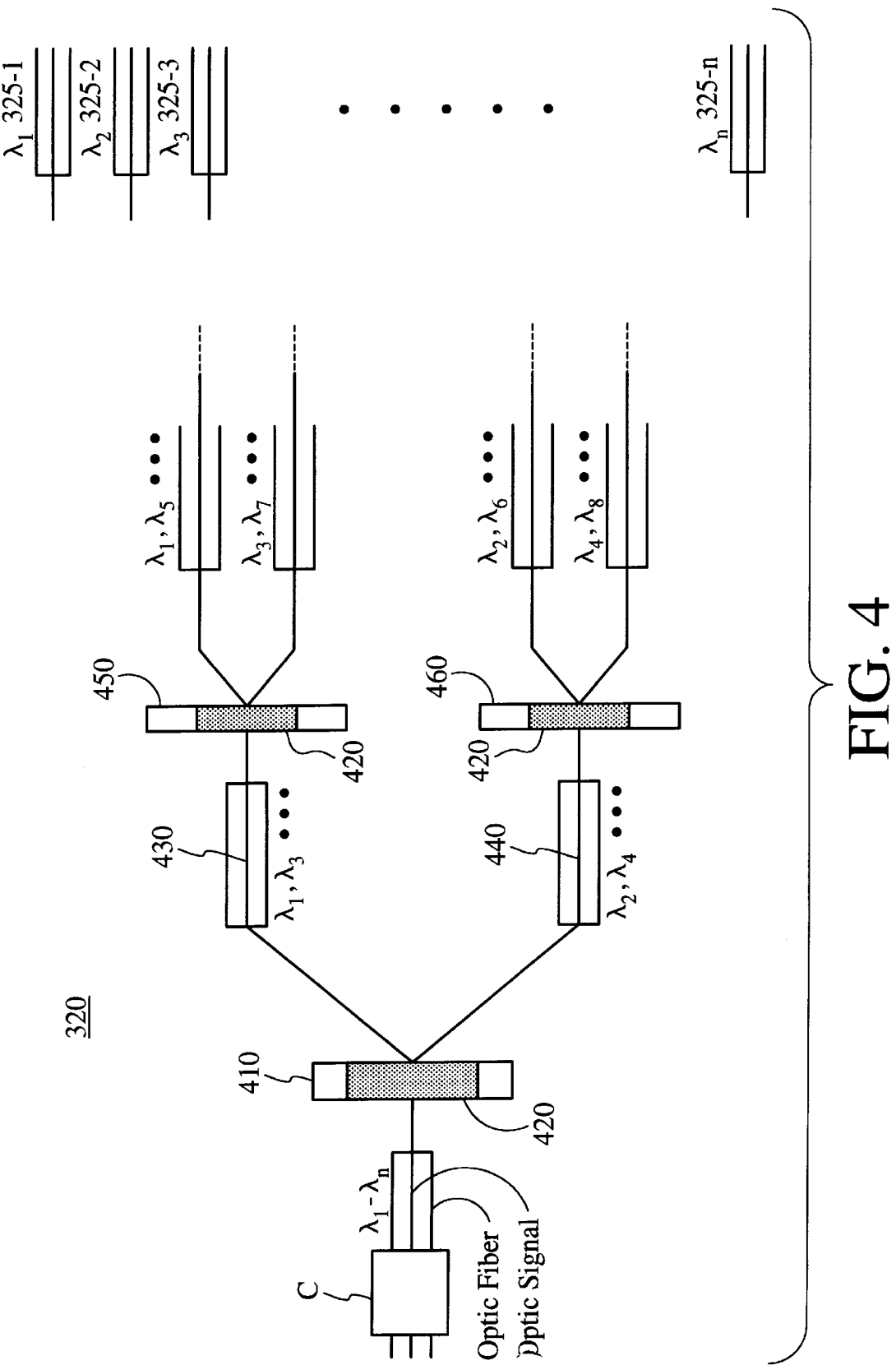
FIG. 4 is a simplified block diagram of a preferred embodiment of the Dense Wavelength Division Multiplexer in accordance with the present invention.

FIG. 4 is a simplified block diagram of a preferred embodiment of the DWDM 320 in accordance with the present invention. This DWDM is disclosed in the co-pending U.S. Patent Application entitled, "Fiber Optic Wavelength Division Multiplexer Utilizing a Multi-Stage Parallel Cascade Method of Wavelength Separation," Ser. No. 09/130,386, filed on Aug. 6, 1998. Applicant hereby incorporates this patent application by reference. The signal comprising channels $\lambda_1 - \lambda_n$ is inputted to the DWDM 320 from node C. It is passed through a glass piece 410. The glass 410 is coated with a reflective material 420 which divides the signal into two separate signals, one comprising the odd channels ($\lambda_1$, $\lambda_3$, $\lambda_5$, . . . ) (430) and the other comprising even channels ($\lambda_2$, $\lambda_4$, $\lambda_6$, . . . ) (440). These odd and even channels are each passed through another glass piece 450, 460 with reflective coatings 420 which further divides them. This division continues until only one channel is outputted to each optic fiber, 325-1 through 325-n. The DWDM 320 of the present invention thus divides the signal with a multistage parallel cascade configuration of the glasses 410, 450, 460. By choosing reflective material 420 with particular properties, specific channels may be targeted for division, thus making the DWDM 320 programmable.

Referring back to FIG. 3B, the channels are further compensated by the Dispersion Compensating Fibers (DCF), 330-1 through 330-n. The DCF compensates the channels for dispersion individually. It functions similarly as the Dispersion Compensator 310, except the Dispersion Compensator adjusted the signal before it was separated into its separate channels. Thus, all of the channels were compensated in the same amount without regard for the variations between them. The DCF thus "fine tunes" the compensation for each channel individually.

As the channels are outputted to the optic fibers, 325-1 through 325-n, they have different gains. By the time a signal reaches a connector point, the variation in the gains could be as large as 10 dBm. Some of these wavelengths may be too large or too small for proper reading by a receiver. Typically receivers operate at an optimal power level for reading with a margin of ±2 dBm. The optimal level is dependent upon the specific design of the system. Thus, channels having gains which place them outside of this range would not be properly read. In order to improve the integrity of the signal before reading, the gains of the channels must be equalized to an appropriate level. Thus, Variable Attenuators, 335-1 through 335-n, are used to equalize the gain of each channel.

Figure 5:
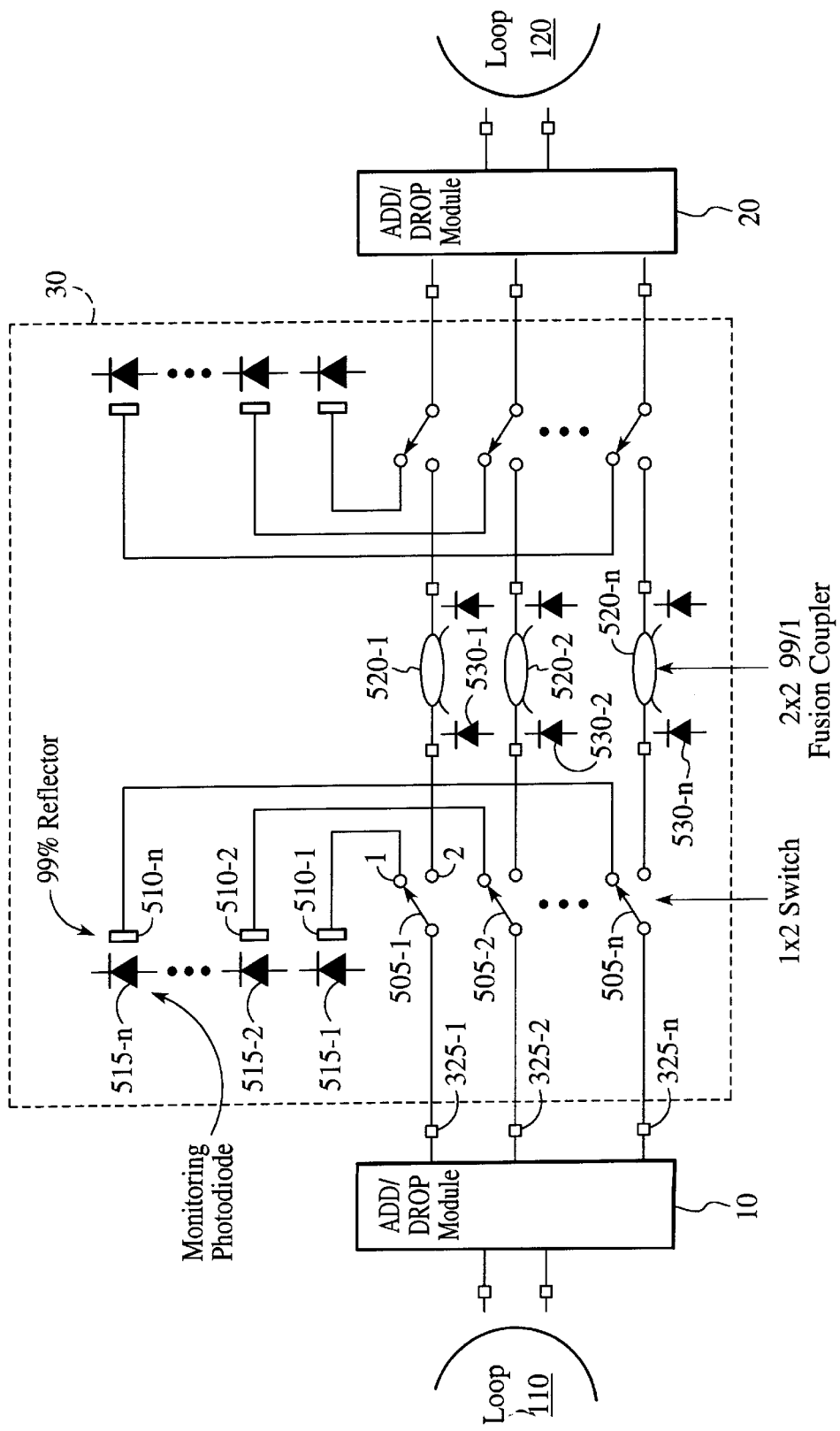
FIG. 5 is a block diagram of a first preferred embodiment of a programmable switch matrix module in accordance with the present invention.

Each channel is then sent from the add/drop module 10 to the programmable switch matrix module 30. FIG. 5 is a block diagram of a first preferred embodiment of the programmable switch matrix module 30 which may be used with the add/drop system 300 in accordance with the present invention. This first embodiment includes switches (505-1 through 505-n); 2×2 Fusion Couplers (520-1 through 520-n) ( preferably of a 99/1 ratio); photodiodes (530-1 through 530-n) connected to the 2×2 Fusion Couplers (520-1 through 520-n); 99% reflectors (510-1 through 510-n) connected to the switches (505-1 through 505-n); and photodiodes (515-1 through 515-n) connected to the 99% reflectors (510-1 through 510-n). These components comprise half of the programmable switch matrix module 30. A mirror image of these components comprise the other half with the two halves connecting at the 2×2 Fusion Couplers (520-1 through 520-n). The performance of the programmable switch matrix module 30 will be discussed in the context of the above labeled components with channels residing on loop 110, however, it is important to note that the mirror components will function in the same manner with channels residing on loop 120.

For this first preferred embodiment, 1×2 switches (505-1 through 505-n) are used. However, one of ordinary skill in the art will understand that other switch configurations could be used without departing from the spirit and scope of the present invention.

As an example, let's assume channel $\lambda_1$ traveling along optic fiber 325-1 is to be exchanged. When the switch 505-1 for $\lambda_1$ is in position 1, $\lambda_1$ of loop 110 is able to travel to loop 120 through the 2×2 99/1 Fusion Coupler 520-1, thereby dropping from loop 110. Similarly, $\lambda_1$ from loop 120 is able to travel to loop 110 through the 2×2 99/1 Fusion Coupler 520-1, thereby adding to loop 110. The 2×2 99/1 Fusion Coupler 520-1 will perform the add and drop of $\lambda_1$ with 99% of its signal while directing 1% of the signal to the photodiode 530-1. The photodiode 530-1 sends the 1% signal to the network management control module 40 (FIG. 3A) for the purpose of switch control and network monitoring. Through this 1% signal, the network management control module 40 is informed of the status of the adding and dropping of channels in the switch matrix module 30 and controls and monitors the switches (505-1 through 505-n), accordingly making this module 30 "programmable." Because each channel is added/dropped separately, a 2×2 99/1 Fusion Coupler and photodiode may be placed for each channel to allow for individual monitoring of the channels.

When the switch for $\lambda_1$ (505-1) is position 2, $\lambda_1$ is not exchanged and is instead sent to the 99% reflector 510-1 which reflects the channel back along the same optic fiber 325-1. The 99% reflector 510-1 is typically comprised of a glass piece treated with a 99% reflective coating. A photodiode 515-1 is connected to the 99% reflector 510-1 to monitor the adding and dropping of the channel. Each switch (505-1 through 505-n), is connected to a 99% reflector, (510-1 through 510-n), and a photodiode, (515-1 through 515-n). Through the photodiodes, (515-1 through 515-n), if an add or drop fails, an error message can be generated.

Figure 2:
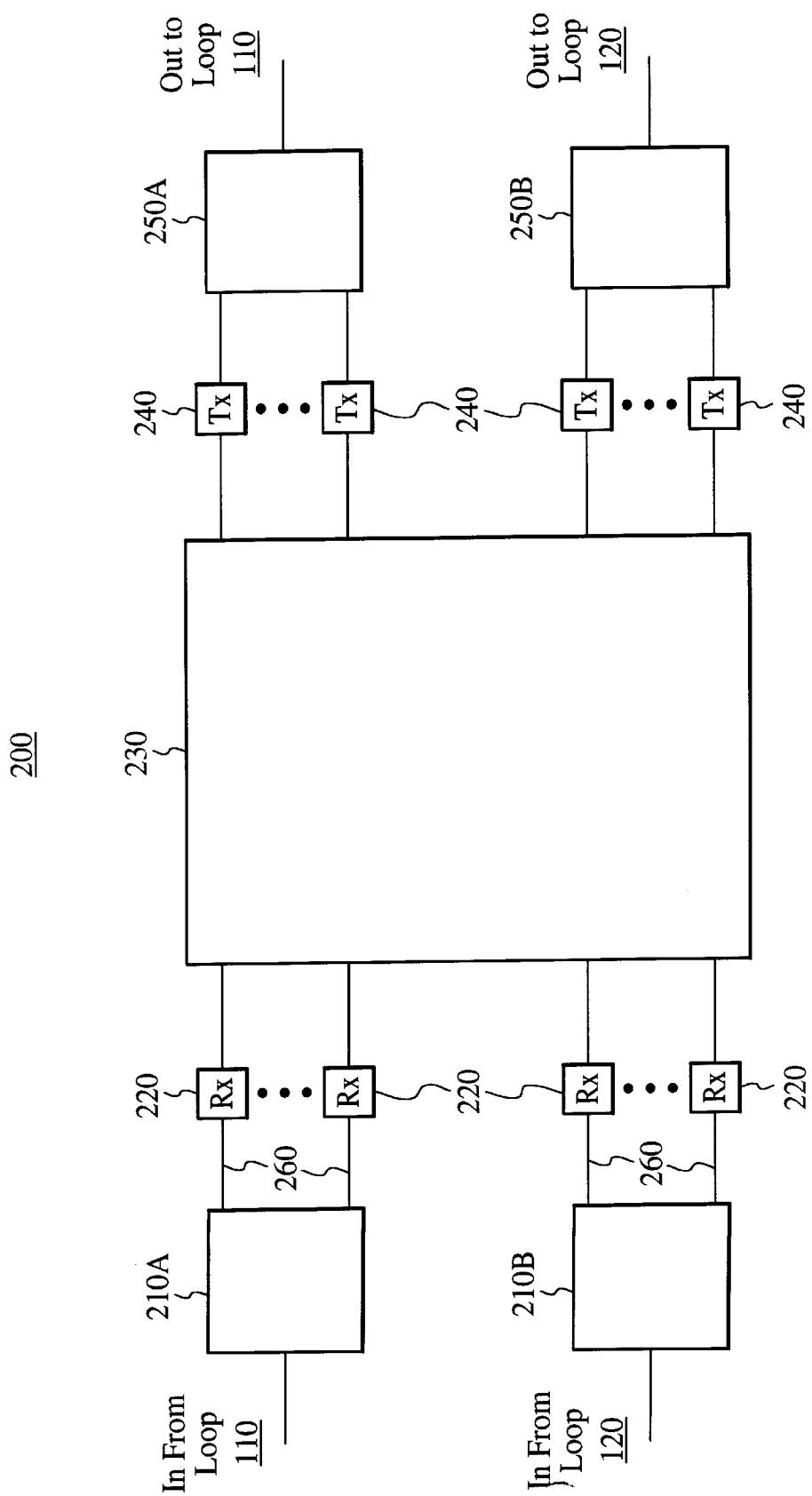
FIG. 2 is an illustration of a conventional add/drop system.

In the above manner, all of the channels comprising the signal in loop 110 is either exchanged or reflected. The channels then travel back along the same optic fiber from which they came. The DWDM 320 combines them into a single new signal and outputs it to node 3. The circulator 315 then directs it from node C to node D. From node D the signal travels back into loop 10 and continues on to its next destination. Because a circulator 315 in combination with a DWDM 320 is used to move a signal back into loop 110, the add/drop system 300 of the present invention only requires two add/drop modules 10, 20 rather than the four add/drop modules 210A, 210B, 250A, and 250B of the prior art (see FIGS. 2 and 3A). By reducing the required number of DWDM's by half, the system 300 of the present invention is less costly.

Figure 6:
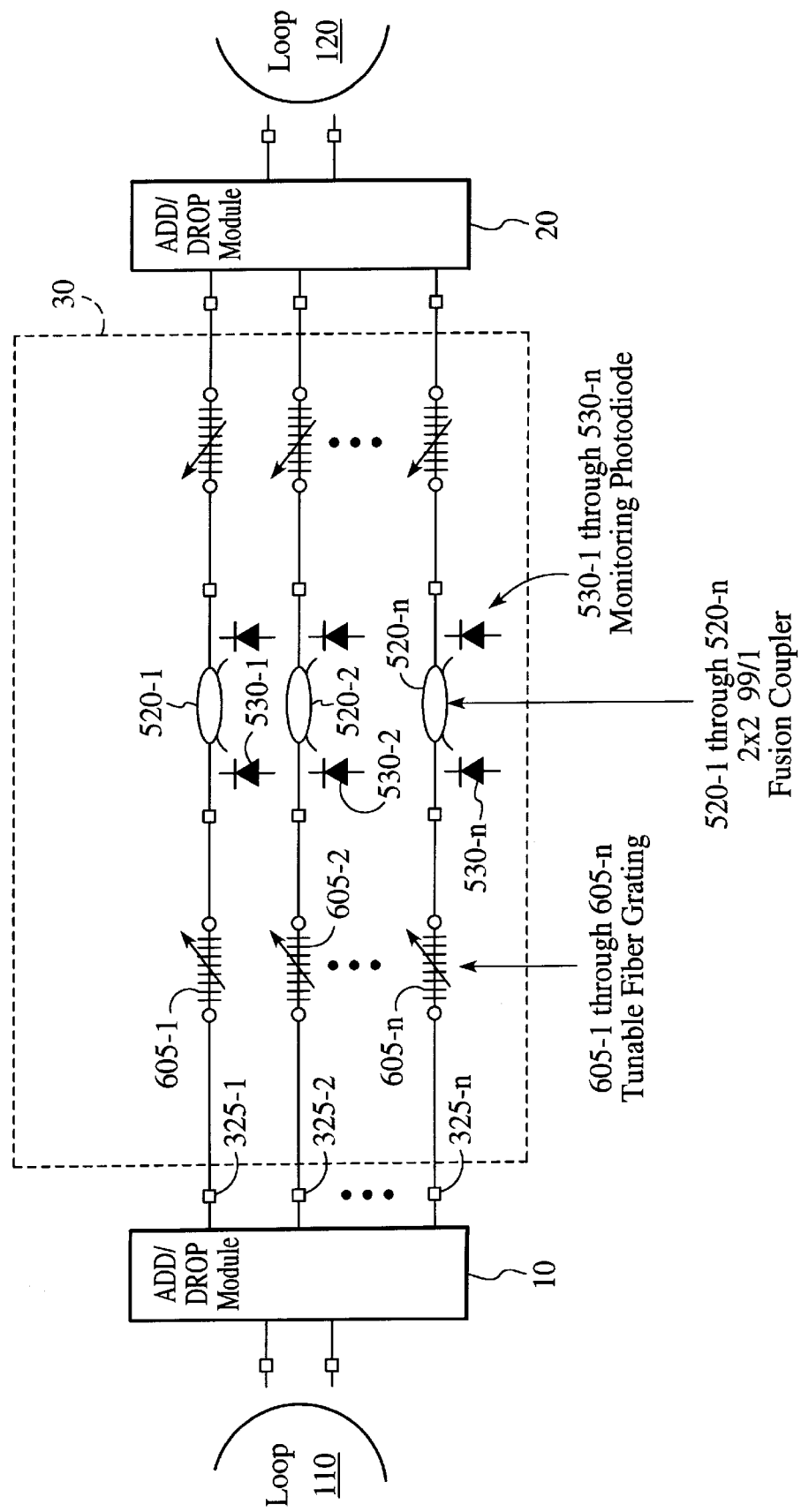
FIG. 6 is a block diagram of a second preferred embodiment of a programmable switch matrix module in accordance with the present invention.

FIG. 6 is a block diagram of a second preferred embodiment of a programmable switch matrix module 30 which may be used with the add/drop system 300 in accordance with the present invention. As with the first preferred embodiment, the functioning of the modules 30 will be described only with half of the components labeled and with channels from loop 110, with the understanding that the other half of the components are mirror images of the first half and functions in the same manner with channels from loop 120. This second embodiment of the switch matrix module 30 includes tunable fiber gratings (605-1 through 605-n); 2×2 Fusion Couplers (520-1 through 520-n); and photodiodes (530-1 through 530-n). Using the same example as with the first embodiment, assume that $\lambda_1$ travels from loop 110 along optic fiber 325-1 into the programmable switch matrix module 30. $\lambda_1$ then enters the Tunable Fiber Grating 605-1 which "tunes" specifically for $\lambda_1$, reflecting that channel back toward loop 110 if it is not to be dropped to the loop 120. If it is to be dropped, then the fiber grading 605-1 would not tune for $\lambda_1$. $\lambda_1$ would then continue to the 2×2 Fusion Coupler 520-1 where 99% of the signal will be exchanged with loop 120 while the other 1% will be directed to the photodiode 530-1 for the purpose of switch control and monitoring by the Network Monitoring Control Module 40. In this manner, all of the channels of the signal in loop 110 are either exchanged or reflected.

Figure 7:
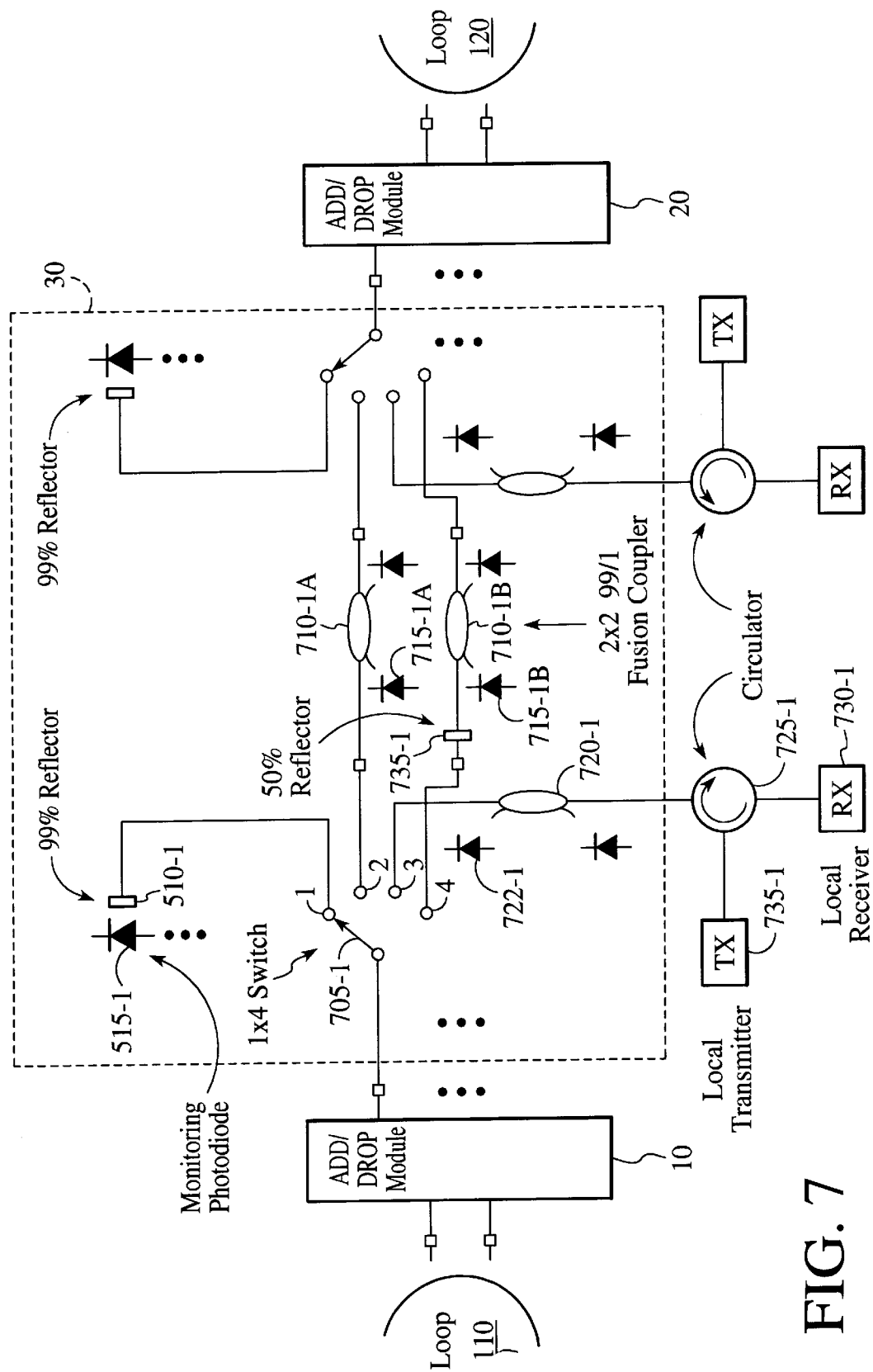
FIG. 7 is a block diagram of a third preferred embodiment of a programmable switch matrix module in accordance with the present invention.

FIG. 7 is a block diagram of a third preferred embodiment of the programmable switch matrix module 30 which may be used with the add/drop system 300 of the present invention. Only the structure for one channel is shown in FIG. 7, however, an identical structure would exist for each channel. Also, as with the first and second preferred embodiments, the functioning of the module 30 will be described only with half of the components labeled and with channels from loop 110, with the understanding that the other half of the components are mirror images of the first half and functions in the same manner with channels from loop 120. This third embodiment includes a 1×4 switch 705-1; a 99% reflector 510-1 connected to the switch 705-1; a photodiode 515-1 connected to the 99% reflector 510-1; two 2×2 Fusion Couplers 710-1A, 710-1B connected to the switch 705-1 (preferably of a 99/1 ratio); two photodiodes 710-1A, 710-1B connected to the 2×2 Fusion Couplers 710-1A, 710-1B; a third 2×2 99/1 Fusion Coupler 720-1 connected to a local port, where the local port includes a circulator 725-1, a local receiver 730-1, and a local transmitter 735-1. By placing the local receiver 730-1 for loop 110 directly at the connector point, the add/drop function could be accomplished directly with the local receiver 730-1 without the signal having to travel further along loop 110 first.

Using the same example as for the first and second embodiments, assume $\lambda_1$ from the signal on loop 110 travels along optic fiber 325-1 into the switch matrix module 30 of FIG. 7. When the switch 705-1 is in position 1, $\lambda_1$ is directed to the 99% reflector 510-1 and is reflected back along the same path to loop 110 in the same manner as with the first embodiment. When the switch 705-1 is in position 2, it is directed to the 2×2 99/1 Fusion Coupler 710-1A which sends 99% of $\lambda_1$ to loop 120 while directing 1% to the photodiode 715-1A for the purpose of switch control and network monitoring by the Network Management Control Module 40.

When the switch 705-1 is in position 3, $\lambda_1$ is be exchanged with its corresponding channel on the local port. First, $\lambda_1$ travels to the 2×2 Fusion Coupler 720-1 where part of it is directed to the photodiode 722-1 for use by the Network Management Control Module 40. The rest of $\lambda_1$ travels through the circulator 725-1 which directs it to the local receiver 730-1 where it is dropped. The local receiver 730-1 converts the channel to an electrical signal in the proper protocol format. The channel to be added from the local port comes in as an electrical signal. The electrical signal passes through the local transmitter 735-1 where it is converted to an optical channel. The optical channel travels through the circulator 725-1 where it is directed through the 2×2 Fusion Coupler 720-1, through the switch 705-1, and onto optic fiber 325-1. $\lambda_1$ is thus exchanged between loop 110 and the local port.

When the switch 705-1 is in position 4, $\lambda_1$ is "broadcast". In a broadcasting situation, not all of a channel is exchanged or reflected. Some part of the channel may be completely dropped to a network without a corresponding add. For example, assume a narrowband video on a demand service channel is to be transmitted from San Francisco to Sacramento and Denver. When the signal reaches the loop which services Sacramento, a portion of the channel is dropped from the signal while the remaining portion of the signal continues to Denver where it is dropped to the loop servicing Denver.

To illustrate how this is done through an example, assume that 50% of $\lambda_1$ from loop 110 is to be broadcast to loop 120. $\lambda_1$ travels along optic fiber 325-1 into the programmable switch matrix module 30 of FIG. 7. It is directed by the switch 705-1 to the 50% reflector 735-1 which reflects 50% of the channel back to loop 10 while allowing 50% of the channel to go to loop 120. The 50% which goes to loop 120 is dropped from the signal. The other 50% is reflected back to loop 110 and moved on to the next connector point. In this manner, an optical channel is broadcast.

In this manner, all of the channels of the signal on loop 110 are either reflected, exchanged with loop 120, exchanged with a local port, or broadcast.

An optical and programmable fiber optic wavelength add/drop system for the exchange of data between loops in an optic network is disclosed. With the system in accordance with the present invention, dispersion compensation, signal amplification, and gain equalization can be performed on the optic signal without the need to convert it to an electrical signal. It also need not be converted for the switching function to be performed. Thus, the system in accordance with the present invention does not have the optical to electrical to optical conversion requirement of conventional systems. As such, it is transparent of bandwidth and protocol independent. Within the present invention, a programmable Dense Wavelength Division Multiplexer and a programmable switch matrix module are also disclosed. Because the system in accordance with the present invention is optical and programmable, the upgrading of the system would not require additional hardware. Different protocols, such as that used by the internet, the telephone, and automatic teller machines may be transported through the same optic fibers. This modular design of the system allows flexibility for upgrading to more complex systems. The present invention has the added advantages of being capable of broadcasting and the monitoring of the adding and dropping of wavelengths individually. Thus, the particular combination of elements of this system provides a system which is flexible, simpler, and more cost effective than conventional systems.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical system for adding and dropping wavelengths in an optical network, the optical network including a first and second optical loop, the system comprising:

means for providing a first optical signal on the first optical loop as a plurality of wavelengths, each wavelength residing on a separate path, wherein each of the plurality of wavelengths are provided in the optical domain, wherein the providing means comprises:
means for compressing the first optical signal,
means for amplifying the compressed first optical signal,
means for separating the compressed and amplified first optical signal into the plurality of wavelengths such that each wavelength resides on a separate path, and
means for equalizing the gain of each wavelength;
means for reflecting any of the plurality of wavelengths;
means for dropping any of the plurality of wavelengths from the first optical loop to the second optical loop and for adding corresponding wavelengths from the second optical loop into the first optical loop, such that the dropping and adding of the wavelengths occurs in the optical domain; and means for combining the reflected wavelengths and the added wavelengths into a second optical signal.

2. An optical system for adding and dropping wavelengths in an optical network, the optical network including a first and second optical loop, the system comprising:

means for providing a first optical signal on the first optical loop as a plurality of wavelengths, each wavelength residing on a separate path, wherein each of the plurality of wavelengths are provided in the optical domain;

means for reflecting any of the plurality of wavelengths;

means for dropping any of the plurality of wavelengths from the first optical loop to the second optical loop and for adding corresponding wavelengths from the second optical loop into the first optical loop, such that the dropping and adding of the wavelengths occurs in the optical domain, wherein the reflecting means and the dropping and adding means resides in a programmable switch matrix modules, wherein the module further comprises:

means for monitoring the reflecting means, and means for monitoring the dropping and adding means; and means for combining the reflected wavelengths and the added wavelengths into a second optical signal.

3. An optical method for adding and dropping wavelengths in an optical network, the optical network including a first and second optical loop, the method comprising the steps of:

a) providing a first optical signal on the first optical loop as a plurality of wavelengths, each wavelength residing on a separate path, wherein each of the plurality of wavelengths are provided in the optical domain, wherein the providing step a) comprises the steps of:

a1) compressing the first optical signal, a2) amplifying the compressed first optical signal, a3) separating the compressed and amplified first optical signal into the plurality of wavelengths such that each wavelength resides on a separate path, and a4) equalizing the gain of each wavelength;

b) reflecting any of the plurality of wavelengths;

c) dropping any of the plurality of wavelengths from the first optical loop to the second optical loop and for adding corresponding wavelengths from the second optical loop into the first optical loop, such that the dropping and adding of the wavelengths occurs in the optical domain; and d) combining the reflected wavelengths and the added wavelengths into a second optical signal.

4. An optical method for adding and dropping wavelengths in an optical network, the optical network including a first and second optical loop, the method comprising the steps of:

a) providing a first optical signal on the first optical loop as a plurality of wavelengths, each wavelength residing on a separate path, wherein each of the plurality of wavelengths are provided in the optical domain;

b) reflecting any of the plurality of wavelengths;

c) dropping any of the plurality of wavelengths from the first optical loop to the second optical loop and for adding corresponding wavelengths from the second optical loop into the first optical loop, such that the dropping and adding of the wavelengths occurs in the optical domain, wherein the reflecting step (b) and the dropping and adding step (c) reside in a programmable switch matrix modules, wherein the module further comprises:

means for monitoring the reflecting means, and means for monitoring the dropping and adding means; and d) combining the reflected wavelengths and the added wavelengths into a second optical signal.

5. An apparatus for adding and dropping signals in an optical network, the optical network including a first and second optical loop, the apparatus comprising:

means for providing a first optical signal on the first optical loop as a plurality of wavelengths, each wavelength residing on a separate path, wherein each of the plurality of wavelengths are provided in the optical domain, wherein the providing means comprises:

means for compressing the first optical signal, means for amplifying the compressed first optical signal, means for separating the compressed and amplified first optical signal into the plurality of wavelengths such that each wavelength resides on a separate path, and means for equalizing the gain of each wavelength;

means for reflecting any of the plurality of wavelengths;

means for dropping any of the first plurality of wavelengths from the first optical loop to the second optical loop and for adding corresponding wavelengths from the second optical loop to the first optical loop, such that the dropping and adding of the wavelengths occurs in the optical domain; and means for combining the reflected wavelengths and the added wavelengths into a second optical signal.

6. An apparatus for adding and dropping signals in an optical network, the optical network including a first and second optical loop, the apparatus comprising:

means for providing a first optical signal on the first optical loop as a plurality of wavelengths, each wavelength residing on a separate path, wherein each of the plurality of wavelengths are provided in the optical domain;

means for reflecting any of the plurality of wavelengths;

means for dropping any of the first plurality of wavelengths from the first optical loop to the second optical loop and for adding corresponding wavelengths from the second optical loop to the first optical loop, such that the dropping and adding of the wavelengths occurs in the optical domain, wherein the reflecting means and the dropping and adding means reside in a programmable switch matrix modules, wherein the module further comprises:

means for monitoring the reflecting means, and means for monitoring the dropping and adding means; and means for combining the reflected wavelengths and the added wavelengths into a second optical signal.

7. A programmable switch matrix modules for an add/drop system in an optical network, the optical network including a first and second optical loop, comprising:

means for reflecting any of a plurality of wavelengths from the first optical loop; and means for dropping any of the plurality of wavelengths from the first optical loop to the second optical loop and for adding corresponding wavelengths from the second optical loop into the first optical loop, wherein the dropping and adding of the wavelengths occurs in the optical domain, wherein each module further comprises:
   means for monitoring the reflecting means, and
   means for monitoring the dropping and adding means.

8. A system for adding and dropping wavelengths in an optical network, the optical network including a first and second optical loop, comprising:
   a first add/drop module optically coupled to the first optical loop;
   a programmable switch matrix module optically coupled to the first add/drop module; and
   a second add/drop module optically coupled to the programmable switch matrix module and to the second optical loop, wherein the first and second add/drop modules each comprise:
     a fiber amplifier,
     a dispersion compensator optically coupled to the fiber amplifier,
     a dense wavelength division multiplexer optically coupled to the dispersion compensator, and
     a plurality of variable attenuators, each optically coupled to the dense wavelength division multiplexer.

9. A system for adding and dropping wavelengths in an optical network, the optical network including a first and second optical loop, comprising:
   a first add/drop module optically coupled to the first optical loop;
   a programmable switch matrix module optically coupled to the first add/drop module, wherein the programmable switch matrix module comprises:
     means for reflecting any of a plurality of wavelengths,
     a plurality of fusion couplers,
     a first plurality of photodiodes for monitoring the reflecting means, and
     a second plurality of photodiodes for monitoring the plurality of fusion couplers; and
   a second add/drop module optically coupled to the programmable switch matrix module and to the second optical loop.

* * * * *